UNITED STATES PATENT OFFICE.

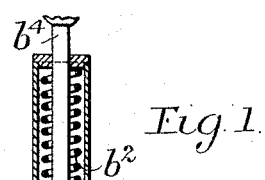

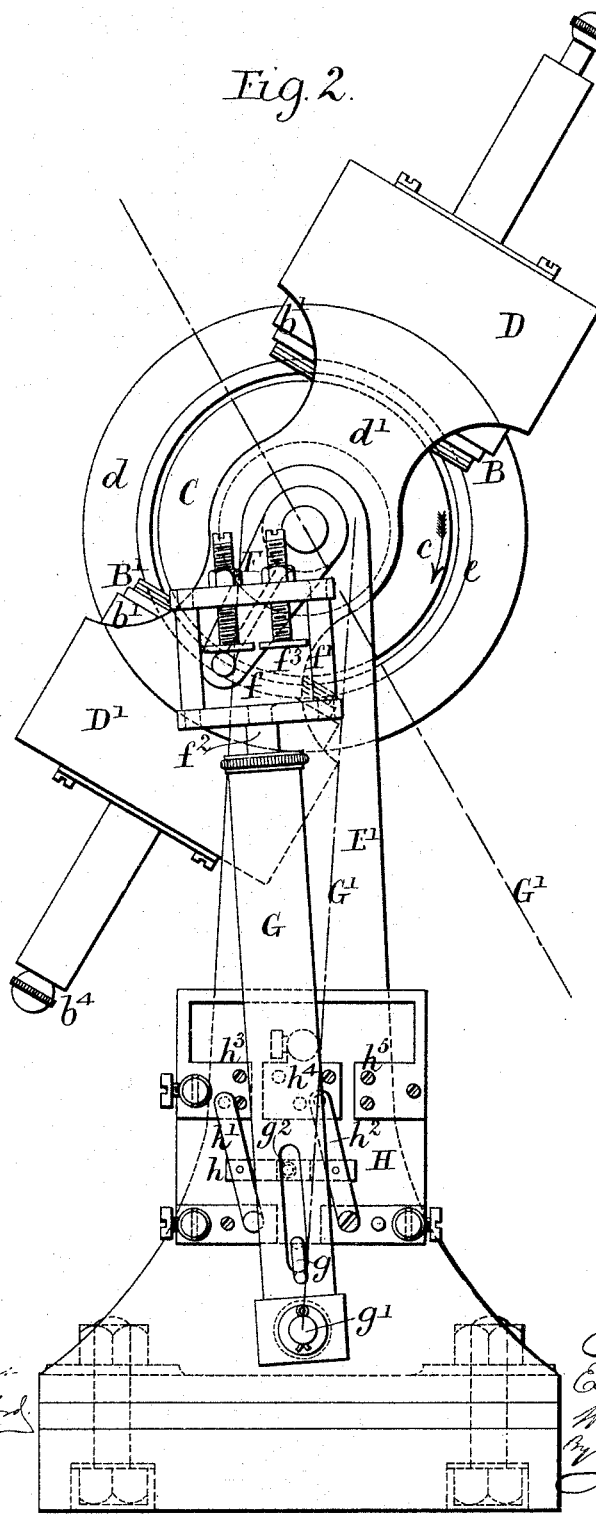

EDWARD J. HOUGHTON AND WILLIAM WHITE, OF LONDON, ENGLAND.

COMMUTATING APPARATUS FOR DYNAMO-ELECTRIC MACHINES.

SPECIFICATION forming part of Letters Patent No. 492,291, dated February 21, 1893.

Application filed March 26, 1892. Serial No. 426,625. (No model.)

*To all whom it may concern:*

Be it known that we, EDWARD JOHN HOUGHTON, residing at Camden, Underhill Road, Dulwich, London, in the county of Surrey, and WILLIAM WHITE, residing at 58 Bread street, London, England, citizens of England, have invented new and useful Improvements in Commutating Apparatus for Dynamo-Electric Machines, of which the following is a specification.

When a dynamo electric machine has its armature driven in the one direction the brushes of the commutator must have a certain lead, that is to say, they must occupy a position beyond a diameter transverse to the polar axis; when the direction of rotation is reversed, the brushes must have an equivalent lead on the other side of the diameter. The lead in either direction has to be increased when the speed of rotation increases and has to be diminished when the speed of rotation is lessened.

This relation relates to such a construction and mounting of the commutator brushes that they are automatically adjusted to suit variations of direction and speed of rotation of the machine.

Figure 1 of the accompanying drawings is a side view and Fig. 2 is a front view of a pair of commutator brushes and their mounting according to the invention.

A indicates the end of the armature shaft of a dynamo electric machine having fixed on it the commutator C on which bear the two opposite brushes B B'. According to this invention each brush B or B' consists of a number of layers of wire gauze contained in a box $b$ which can slide within an outer box $b'$ being pressed toward the commutator C by a spring $b^2$. Over the layers of wire gauze B is a plate $b^3$ which can be advanced by a screw $b^4$ advancing the wire gauze as it becomes worn by its friction on the commutator. The box $b'$ of each brush is fixed in a block D and these two blocks are connected together by circular frames $d\ d'$ which are mounted on frames E E'. The circular frame $d$ is fitted to revolve on a lip $e$ projecting from the frame E the other circular frame $d'$ has an axial pin $e'$ which can revolve in a hole in the upper part of the frame E' concentric with the lip $e$. On the pin $e'$ is fixed a crank F the pin $f$ of which is engaged within a yoke $f'$ fixed on the head of a rod $f^2$. Within the yoke $f'$ are plates $f^3$ adjustable by screws and nuts, the one or the other of these plates bearing on the crank pin $f$ according as the armature of the machine revolves in the one direction or the other. The rod $f^2$ is free to slide in a tube G in which it is pressed down by a spring bearing on a collar $f^4$ at the lower end of the rod. From this collar a pin $g$ projects through a slot of the tube G and is designed to connect with the slide of an ordinary centrifugal governor which we do not deem necessary to illustrate so that the pin $g$ is drawn up the farther the greater the speed of the governor which is geared to the armature of the machine so as to revolve with proportional speed. The tube G is pivoted at $g'$ and has behind it a pin $g^2$ entering a hole in a bar $h$ to which are jointed two contact springs $h'\ h^2$ which with contact plates $h^3\ h^4\ h^5$ constitute a switch H for reversal of current. When the commutator revolves in the direction of the arrow $c$, the friction resulting from the pressure of the brushes B B' on it causes the brushes and the framing which carries them to revolve to the inclined position shown in Fig. 2, determined by the bearing of the crank pin $f$ against the one of the plates $f^3$ the further movement being resisted by the spring acting on the rod $f^2$. When the speed of rotation increases, the governor drawing up the pin $g$ raises the plates $f^3$ allowing the crank pin $f$ to rise and the brushes B B' to turn farther or acquire more lead. When the direction of rotation of the armature is reversed, the brushes are by the friction moved over to an inclination in the opposite direction, the tube G moving on its pivot $g'$ to a position such as is indicated by the dotted line G', and its pin $g^2$ acting on the switch H so as to change the circuits to suit the change of direction of rotation.

Having thus described the nature of our invention and the best means we know for carrying the same into practical effect, what is claimed in respect of commutating apparatus for dynamo electric machines is—

1. A commutator brush, consisting of layers of wire gauze, a sliding box in which said layers of wire gauze are arranged, a spring acting to advance the box, a pressure plate bearing against the said layers, and a screw acting on the pressure plate, substantially as described.

2. The combination with a suitable support, and a commutator, of a rotatable frame carrying commutator brushes and having a crank pin, a rod adapted to engage with a governor and having a yoke adjustably connected with the crank pin, and a spring acting to press the rod downward, substantially as described.

3. The combination with a commutator, and a brush carrying frame having a crank pin, of a pivoted tube, a rod located in the tube and having a yoke connected with the crank pin, and a spring arranged in the tube and acting to press the rod downward, substantially as described.

In testimony whereof we have signed our names to this specification, in the presence of two subscribing witnesses, this 18th day of February, A. D. 1892.

EDWARD J. HOUGHTON.
WILLIAM WHITE.

Witnesses:
OLIVER IMRAY,
*Chartered Patent Agent, 28 Southampton Buildings, London, W. C.*
JNO. P. M. MILLARD,
*Clerk to Messrs. Abel & Imray, Consulting Engineers and Patent Agents, 28 Southampton Buildings, London, W. C.*